July 11, 1950

D. A. ELLIOTT 2,514,539

LAWN MOWER

Filed Dec. 1, 1947

INVENTOR.
DWIGHT A. ELLIOTT.
BY Clifford C. Bradbury
ATTORNEY

Patented July 11, 1950

2,514,539

UNITED STATES PATENT OFFICE 2,514,539

LAWN MOWER

Dwight A. Elliott, Richmond, Ind.

Application December 1, 1947, Serial No. 789,025

1 Claim. (Cl. 56—289)

This invention relates to lawn mowers, and particularly to that type of lawn mower utilizing a multiblade spiralled reel cooperating with a stationary blade for shearing the grass.

In a lawn mower of this type, the effectiveness of the mower is determined almost entirely by the accuracy and pressure with which the edges of the spiral blades may be made to meet the edge of the cutter blade throughout the entire length of the cutting overlap.

One of the objects of this invention is to provide a structure in which the cutter blade pressure and alignment may be secured quickly, accurately and easily.

Another object of the invention is to provide a construction in which the cutter blade may be floated into accurately aligned adjustment with the reel blades.

Another object of this invention is to provide a cutter blade mounting using a single clamping means for securing the cutter blade in its adjusted position.

Other objects and novel features of the invention will be apparent from the following detail description, drawings and claim.

In the drawings illustrating this invention,

Figure 1:
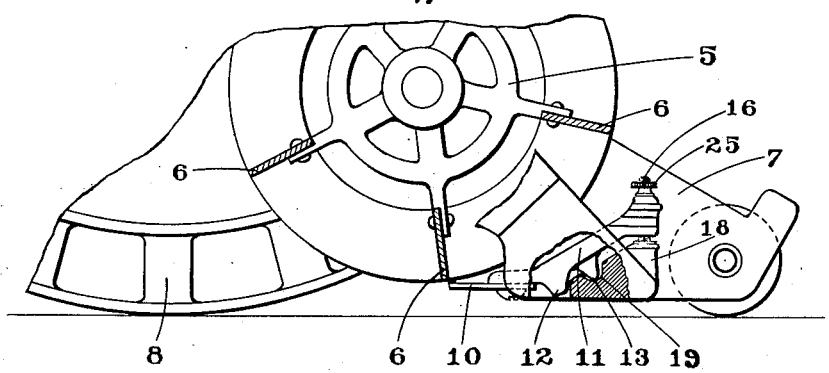
Fig. 1 is a fragmentary end view, with parts in section, of a lawn mower embodying the features of my invention.
Figure 2:
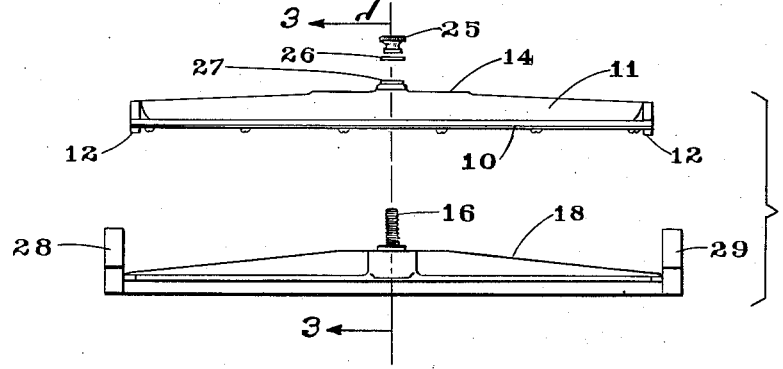
Fig. 2 is a view in front elevation, showing, in unassembled relation, a cutter blade mounting, support and securing means.
Figure 3:
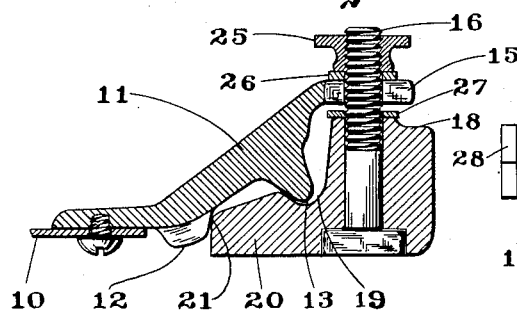

Fig. 3 is an enlarged sectional view taken on a vertical line 3—3 passing through the elements 14, 15, 18 and 25 looking to the left if Fig. 2 were assembled.

Figure 4:
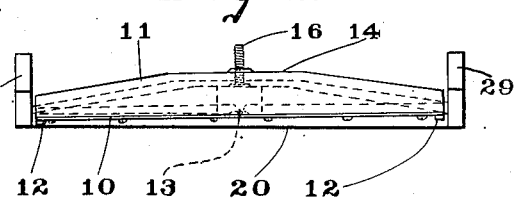

Fig. 4 is a front elevation in full and dotted lines of the cutter blade mounting and support.

The lawn mower with which the cutter bar adjustment is shown is of a conventional type in which a reel 5, carrying a plurality of spiralled cutting blades 6, 6, is rotatably mounted between end plates, such as 7, and is geared to a pair of traction wheels, such as 8, from which it is driven.

Referring now to the more novel features of this invention, a cutter blade 10 is rigidly secured to a mounting member 11. The mounting member 11 comprises a casting or a forging provided on its underside near its lower edge with a pair of rounded knobs 12, 12, and midway of its ends and on its under face with a downwardly projecting pivotal supporting lug 13. A horizontal portion 14, at the upper edge of the member 11, is provided with a bifurcated portion 15, to receive a screw-threaded stud 16.

Rigidly secured between the end frame members 7, and to the rear of the cutter blade reel 5, is a cutter blade support 18, provided midway of its ends with a well or depression 19, to receive the pivotal supporting lug 13. The forward portion 20 of the cutter blade support is rounded, as at 21, for rocking and sliding engagement with the rounded knobs 12, 12 on the lower face of the cutter blade mounting member 11. The screw-threaded stud 16 is secured to and extends upwardly through the cutter blade support 18 and the bifurcation 15 of the mounting member 11, to receive a clamping nut 25, and washers 26 and 27. End supports 28 and 29 on the cutter bar support are provided for rigidly attaching the support to the end frame members 7, 7.

With the structure above described, when the clamping screw 25 is loosened, the cutter blade mounting 11 will be supported in a floating position as determined by the contact of the knobs 12, 12 and the pivotal member 13 with the cutter bar support 18, and in such a manner that the advance edge of the cutter blade 10 may be moved forward of the machine and up and down with respect to the reel blades without relative lateral displacement of the ends of the cutting blade 10. However, because of the engagement of the pivotal member 13 on the cutter bar mounting 11 with the well 15 in the cutter bar support 18, the opposite ends of the cutter blade 10 may be slightly displaced vertically with respect to each other. The blades 6, 6 of the reel are spiralled with such a pitch that there are at all times at least two contact points between the reel blades 6 and the cutter blade 10 upon opposite sides of the pivot.

By placing the fingers upon the upper face of the mounting 11 and upon the opposite sides of the stud 16 and exerting a slight pressure, the cutter blade 10 may be adjusted for the required pressure between the cutter blade 10 and the spiral blades 6, 6, and as the reel is rotated, the pressure between the blades will automatically swing the cutter blade around the pivot 13 into cutting alignment with the spiral blades. When the desired cutting pressure has been determined, the clamping nut 25 is tightened down against the upper face 14 of the cutter bar mounting 11 with just sufficient pressure to prevent the cutter blade 10 dropping away from its position of adjustment.

By means of this structure, the proper cutting adjustment for the mower may be established quickly, easily and accurately without a tedious operation requiring a mechanic's skill. Moreover, the cutter blade and its support may be removed easily for sharpening or replacing the blade, and the replacement and adjustment of the parts may be made quickly and easily by anyone with but slight mechanical skill.

Although I have shown and described my invention with respect to certain details of construction, it is to be understood that many variations may be made without departing from the spirit or scope of my invention.

I claim:

In a lawn mower in combination, a pair of end supporting members, a multiblade reel rotatably mounted between the end members, a rigid bar connected at its opposite ends to the end supporting members, said bar being provided on its forward edge with a rounded projecting surface and midway of its ends with an indentation in its upper surface, a cutter blade, a support for the cutter blade having rearwardly extending knobs at opposite ends for rocking engagement with the rounded projecting surface on the forward edge of the rigid bar and with a centrally located pivoting member extending downwardly into the indentation in the rigid bar, and adjustable clamping means between the rigid bar and the cutting blade support located centrally thereof.

DWIGHT A. ELLIOTT.

REFERENCES CITED

The following references are of record in the file of this patent:

UNITED STATES PATENTS

| Number | Name | Date |
|---|---|---|
| 223,750 | Olcott | Jan. 20, 1880 |
| 1,802,304 | Anderson | Apr. 21, 1931 |
| 2,080,354 | Diel | May 11, 1937 |